Oct. 31, 1950 S. MAIORCA 2,528,156
WHEEL WITH RESILIENTLY SUSPENDED RIM
Filed Dec. 11, 1946 2 Sheets-Sheet 1
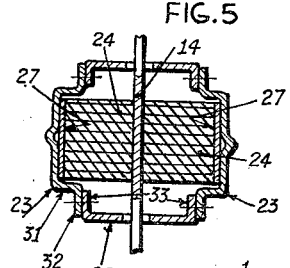
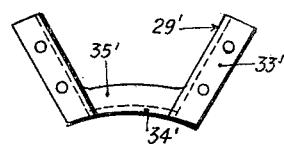
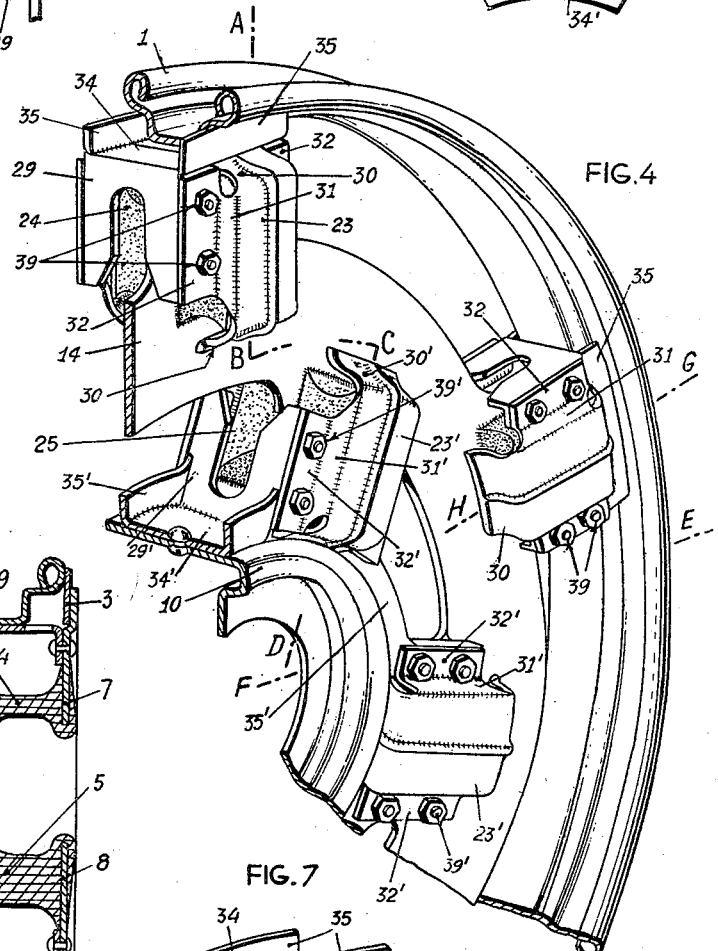
Inventor
Salvatore Maiorca
by Sommers & Young
Attorneys Oct. 31, 1950        S. MAIORCA        2,528,156
WHEEL WITH RESILIENTLY SUSPENDED RIM
Filed Dec. 11, 1946        2 Sheets-Sheet 2
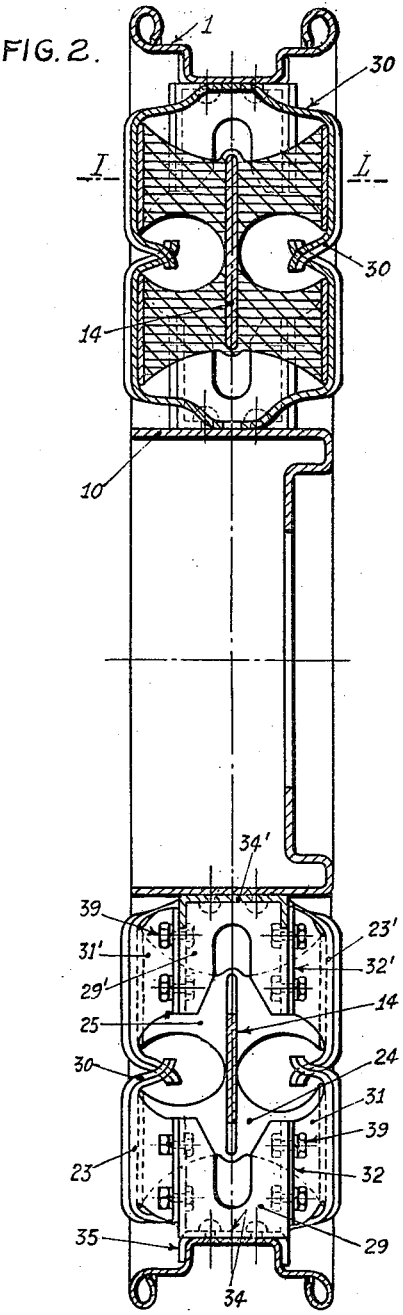
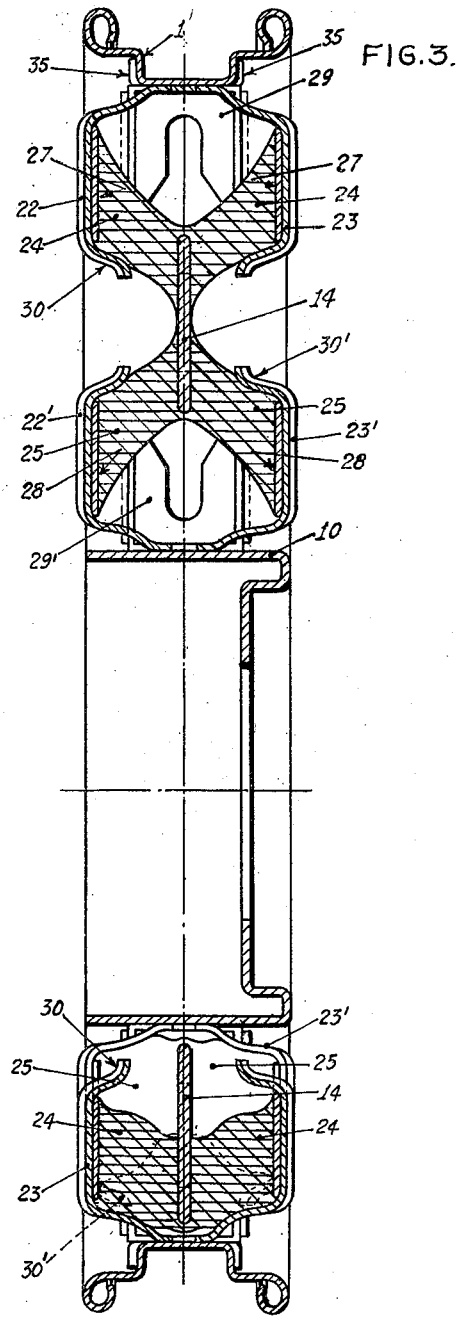
Inventor
Salvatore Maiorca
by Sommers & Young
Attorneys Patented Oct. 31, 1950

2,528,156

UNITED STATES PATENT OFFICE 2,528,156

WHEEL WITH RESILIENTLY SUSPENDED RIM

Salvatore Maiorca, Turin, Italy

Application December 11, 1946, Serial No. 715,497
In Italy December 12, 1945

8 Claims. (Cl. 152—44)

This invention relates to a wheel the rim of which is resiliently suspended with reference to the hub through the interposition of resilient members of rubber pre-compressed in an axial direction and working in shear or bending shear in the plane of the wheel; said members being arranged on a circular row or, better, on two or more circular rows, in order to obtain a wider range of resilient deformation.

According to the invention said rubber members may consist of either continuous or interrupted rings, that is, consisting in the latter case of circular sectors or blocks. The resilient rubber members, suitably distributed on two coaxial rows, are fixed to a rigid central core consisting of a flat metal ring set edgeways on the middle plane of the wheel. When continuous rubber rings are used, they may form a single unit of double T section enclosing the core formed by the central flat ring.

The adoption of divided rings, i. e. rings formed of sectors or blocks, is generally preferable, as with this construction the resiliency of the wheel may be more satisfactorily adjusted and the degree of transverse compression of the rubber is increased without setting up abnormal deformation of the member under buckling stresses.

Under given conditions, in fact, when arranging the rubber all round the circumferences, that is, when using continuous rings instead of separate blocks, in order to attain sufficient resiliency of the wheel, the thickness of said rubber rings would have to be so reduced as to afford an unsufficient resistance against the required transverse compression.

The accompanying drawings show, by way of example, in Figures 1 to 7 two embodiments of the invention, using continuous rubber rings and divided rings, that is, rubber blocks, respectively.

Figure 1 is a part axial section of a wheel with a resilient rim resiliently suspended according to the first embodiment.

Figures 2 and 3 are axial sections of a further wheel taken on the top portion above the axis along line ABCD and, in the bottom portion, along line EF and GH of Figure 4, in the relaxed position and under load, respectively.

Figure 4 is a partially sectional perspective view of the wheel shown in Figures 2 and 3; Figure 5 is a cross section on line IL of Figure 2; and Figures 6 and 7 show details of the stirrup shaped members, fastened respectively to the rim and hub, which connect together lateral housing elements enclosing blocks of pre-compressed rubber.

Referring to Figure 1, numeral 1 denotes the rim, on which is mounted, for example, the tyre. rim 1 comprises two radial flanges 2 and 3, the second of which is of smaller size, so as to allow of inserting the wheel body between rim 1 and hub 10. Said flanges may also form a unit with the rim instead of being separately welded to the sides of a standard rim as shown in the drawing.

The wheel body comprises a rubber member of double T section consisting of two rings or circular bands 4 and 5 having a profile as shown in the drawing, connected together at their middle portion by a flange 6 enclosing a metal core 14 formed by a flat ring of, for instance, aluminum or iron, placed edgeways and to which the rubber is firmly fastened by known means.

To the sides of the rings or bands 4 and 5 are mounted, partly incorporated in the rubber and firmly fixed to it, radial metal rings 7 and 8 turned respectively outwards and inwards. Radial rings 7 and 8 are further connected joined together by bridge pieces 9, fixing of which sets up a transverse compression in the rubber member. Rings 7 and 8 also serve as connection, for example, through bolts, to flanges 2 and 3 of the rim and to flanges 12 and 13 of hub 10.

Referring to the modified construction shown in Figures 2 and 7, the continuous flanged metal ring 14 set edgeways on the centre line of the wheel between hub 10 and rim 1, has radial extensions towards the rim and towards the hub, to which are fastened, on both sides, by vulcanizing, the pairs of blocks 24 and 25 of the outer and inner row, respectively. The blocks 24 and 25 are suitably connected, as by vulcanizing by their outer faces to metal plates 27 and 28, of similar shape and size, and the outer and inner blocks are clamped between housing elements 23 and 23', respectively.

The housing elements 23 and 23' are provided with stiffening ribs and have side flanges 32, 32' by which they are fastened through bolts 39 to flanges 33 of metal stirrups 34, 34' reinforced by cross arched ribs 29, 29', Figures 6 and 7. Two cross ribs are provided in each housing element.

Each member 34 has, besides the cross ribs 29 and flange 33, longitudinal flanges 35 which are vulcanized or otherwise secured to the outer side of the well of rim 1.

The internal members 34' (Figure 7), besides the cross rib 29' and flanges 33', are provided with reinforcing ribs 35'. Each member 34' serves to connect the housing elements of two contiguous blocks through the flanges 33' which are connected to flanges 32' of the housing elements through bolts 39'.

The sides 31, 31' of the housing elements are shaped so as to graduate the angular deformations of the rubber blocks resting on them; they are also provided with heads 30, 30' which serve the same purpose of adjusting the deformations in a radial direction according to requirements as the rubber blocks gradually bear thereon after a certain degree of radial deformation.

Arrangement of bridge-pieces 29, 29' along an arc together with the staggering of the rubber blocks of the outer row with respect to those of the inner row, afford maximum resilient deformations, and, consequently, the maximum relative movement between rim and hub in the plane of the wheel, even with wheels of small diameter.

What I claim is:

1. In a resilient wheel, a hub, a rim, a flat metal disc radially arranged edgewise in the middle plane of the wheel, two circular concentric rows of rubber pads vulcanized to said disc, the pads of the inner row being connected to side flanges on the hub and the pads of the outer row being connected to side flanges on the rim.

2. In a resilient wheel, a hub, a rim, means for resiliently supporting said hub and rim relatively to each other comprising, a flanged ring of metal radially arranged in the middle plane of the wheel and being provided with radial extensions, rubber pads integrally connected by pairs, one on each side on said radial extensions of the ring and means connecting said pads with said rim and said hub, respectively.

3. A resilient wheel comprising a hub, a rim, and a flanged metal ring radially arranged in the middle plane of the wheel, said ring being provided with radial extensions, and rubber pads vulcanized by pairs one on each side on said radial extensions of the ring, the pad pairs being arranged on two co-axial rows staggered to each other and means connecting said pads with said rim or said hub, respectively.

4. A resilient wheel comprising a hub, a rim, a flanged metal disc radially arranged in the middle plane of the wheel, said ring being provided with radial extensions, rubber pads vulcanized by pairs on said extensions, and a pair of box-halves one for each pad for compressing the pads in a direction transversely of the wheel between the respective pairs of box-halves and means connecting said pads with said rim or said hub, respectively.

5. A resilient wheel comprising a hub, a rim, a flanged metal disc radially arranged in the middle plane of the wheel, said ring being provided with radial extensions and rubber pads integrally connected by pairs on said extensions, pairs of box-halves for compressing each pair of pads in a direction transversely of the wheel, said box-halves being secured to the rim and hub, respectively, by means of stirrups provided with cross bridge-shaped ribs.

6. A resilient wheel comprising a hub, a rim, a flanged metal ring radially arranged in the middle plane of the wheel, said ring being arranged between two rubber rings connected together to form a double T-section means for compressing said rings in a direction transversely of the wheel and means for connecting said compressing means with either said rim or said hub, respectively.

7. A resilient wheel comprising a hub, a rim, a flanged metal disc radially arranged in the middle plane of the wheel and incorporated between rubber rings connected together to form a double T-section, annular metal flanges compressing the rubber rings in a transverse direction, said flanges being incorporated in the rubber rings and being connected to cooperating flanges on the rim and hub, respectively.

8. A resilient wheel comprising a hub, a rim, a flanged metal disc radially arranged in the middle plane of the wheel, rubber rings secured to said disc and connected together to form a double T-section, annular metal flanges compressing the rings in a transverse direction and being connected to the rubber rings and to cooperating flanges on the rim and hub, respectively, and bridge-pieces connecting together the flanges incorporated in the rings and compressing the rubber rings in a transverse direction.

SALVATORE MAIORCA.

REFERENCES CITED

The following references are of record in the file of this patent:

UNITED STATES PATENTS

| Number | Name | Date |
|---|---|---|
| 472,856 | Carmont | Apr. 12, 1892 |
| 519,807 | Cloud | May 15, 1894 |
| 1,684,596 | Patch | Sept. 18, 1928 |
| 2,295,269 | Piron | Sept. 8, 1942 |
| 2,295,270 | Piron | Sept. 8, 1942 |

FOREIGN PATENTS

| Number | Country | Date |
|---|---|---|
| 14,400 | France | Nov. 27, 1911 |